US006987880B2

(12) United States Patent
Dolan et al.

(10) Patent No.: US 6,987,880 B2
(45) Date of Patent: Jan. 17, 2006

(54) EFFICIENT DOCUMENT BOUNDARY DETERMINATION

(75) Inventors: John E. Dolan, Vancouver, WA (US); John C. Dalrymple, Portland, OR (US); James Zhixin Chang, Vancouver, WA (US); Xiao-fan Feng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 747 days.

(21) Appl. No.: 09/814,585

(22) Filed: Mar. 22, 2001

(65) Prior Publication Data

US 2002/0136451 A1    Sep. 26, 2002

(51) Int. Cl.
G06K 9/00   (2006.01)
G06K 9/48   (2006.01)
(52) U.S. Cl. .................................. 382/165; 382/199
(58) Field of Classification Search ............... 382/162, 382/165, 166, 181, 199, 254, 264, 266, 312; 358/400, 486, 488, 494, 500, 509, 523, 530
See application file for complete search history.

(56) References Cited

U.S. PATENT DOCUMENTS

| | | | | |
|---|---|---|---|---|
| 4,538,185 A | * | 8/1985 | Wiggins | 358/494 |
| 4,541,713 A | | 9/1985 | Maekawa | 355/75 |
| 4,568,181 A | | 2/1986 | Nishiyama | 355/75 |
| 4,572,650 A | | 2/1986 | Okuda | 399/376 |
| 4,698,511 A | | 10/1987 | Sueda et al. | 250/559.19 |
| 4,737,804 A | | 4/1988 | Ayata et al. | 347/3 |
| 4,823,395 A | * | 4/1989 | Chikauchi | 382/199 |
| 4,875,104 A | * | 10/1989 | Kamon | 358/400 |
| 4,929,844 A | | 5/1990 | Houjiyou et al. | 250/559.2 |
| 4,954,846 A | | 9/1990 | Matsuo et al. | 399/51 |
| 5,119,130 A | | 6/1992 | Tsudaka et al. | 399/376 |
| 5,122,833 A | | 6/1992 | Sato | 399/376 |
| 5,130,789 A | * | 7/1992 | Dobbs et al. | 358/500 |
| 5,236,072 A | | 8/1993 | Cargill | 194/207 |
| 5,239,387 A | | 8/1993 | Stein et al. | 358/444 |
| 5,491,759 A | | 2/1996 | Nagao et al. | 382/199 |
| 5,568,281 A | | 10/1996 | Kochis et al. | 358/475 |
| 5,677,776 A | | 10/1997 | Matsuda et al. | 358/475 |
| 5,719,958 A | * | 2/1998 | Wober et al. | 382/199 |
| 5,760,412 A | * | 6/1998 | Yang et al. | 250/559.4 |
| 5,796,877 A | | 8/1998 | Gusmano | 382/298 |
| 5,805,294 A | | 9/1998 | Furuoya | 358/296 |
| 5,805,970 A | | 9/1998 | Kasamutsu | 399/376 |
| 5,818,976 A | | 10/1998 | Pasco et al. | 382/289 |
| 5,901,243 A | * | 5/1999 | Beretta | 382/168 |
| 5,956,468 A | * | 9/1999 | Ancin | 358/1.9 |

(Continued)

FOREIGN PATENT DOCUMENTS

JP    200122285585    3/2000

*Primary Examiner*—Andrew W. Johns
*Assistant Examiner*—Amir Alavi
(74) *Attorney, Agent, or Firm*—Chernoff, Vilhauer, McClung & Stenzel (57) ABSTRACT

An imaging system includes an imaging sensing device sensing an object having a first background color and a backing in opposing relationship with the object having a second background color which is substantially the same as the first background color. The imaging system determines at least one general bounding region of the object based upon a shadow cast onto backing by the object.

45 Claims, 4 Drawing Sheets

U.S. PATENT DOCUMENTS

| | | | |
|---|---|---|---|
| 5,963,767 A * | 10/1999 | Habets et al. | 399/271 |
| 6,005,683 A | 12/1999 | Son et al. | 358/488 |
| 6,014,229 A | 1/2000 | Yun | 358/449 |
| 6,046,828 A | 4/2000 | Feng et al. | 358/488 |
| 6,075,623 A | 6/2000 | Yun | 358/486 |
| 6,097,852 A | 8/2000 | Yamamoto | 382/282 |

* cited by examiner

EFFICIENT DOCUMENT BOUNDARY DETERMINATION

BACKGROUND OF THE INVENTION

The present application relates to document boundary determination.

Optical scanners operate by imaging an object, typically in the form of a sheet of paper, document, or other form of medium with a light source. The optical scanner senses a resultant light signal from the medium with an optical sensor array that includes pixel elements generating a data signal representative of the intensity of light impinging thereon for a corresponding portion of the imaged object. The data signals from the array are then processed (typically digitized) and utilized by a utilization apparatus or stored on a suitable medium such as a hard drive of a computer system for subsequent display and/or manipulation.

Various types of photo sensor devices may be used in optical scanners. For example, a commonly used photo sensor device is the charge coupled device (CCD), which builds up an electrical charge in response to exposure to light. The size of the electrical charge built up is dependent on the intensity and duration of the light exposure. In optical scanners, CCD cells are typically arranged in linear arrays. Each cell or "pixel" has a portion of a scan line image impinged thereon as the scan line sweeps across the scanned object. The charge build up in each of the pixels is measured and discharged at regular "sampling" intervals.

The image of a scan line portion of a document is projected onto the scanner's linear sensor array by scanner optics. In CCD scanners, the scanner optics typically comprise an imaging lens which typically reduces the size of the projected image from the original size of the document. Pixels in a scanner linear photo sensor array are aligned in a direction perpendicular to the "scan" direction, i.e. the paper or scanner movement direction for scanning of the image.

At any instant when an object is being scanned, each pixel in the sensor array has a corresponding area on the object which is being imaged thereon. This corresponding area on the scanned object is referred to as an "object pixel." An area on a scanned object corresponding in area to the entire area of the linear sensor array is referred to as an "object scan line" or "scan line." For descriptive purposes, a scanned object is considered to have a series of fixed adjacently positioned scan lines. Scanners are typically operated at a scan line sweep rate such that one scan line width is traversed during each sampling interval.

Some optical scanning machines include an automatic document feeder for feeding a document past the optical array. Other optical scanners machines are known as "flat-bed" scanners, wherein a document is placed on a fixed platen for scanning, which occurs by moving the sensor array relative to the fixed document.

It is advantageous in various applications to sense the location of a document edge. In a printer, for example, the print area differs depending on whether the printing is on envelopes, name card paper, letter sized paper, and so on. The prediction of the print area assists in driving the print head. The print area can be identified by sensing the media edges. By identifying the document area, proper clipping can be made on both sides when printing. In a scanner, detection of the document edges can assist by placing the image area properly on the page, and by reducing the scan memory size by clipping the empty regions. Also, by detecting the edge position in the direction of document movement, the document skew can be estimated and used to redirect the scanned image in print. This will produce a more pleasing output from the scanning process. In a copier, sensing the size of a document permits scaling of the input document to the maximum size that will fit on an output page. In addition, multi-function machines combine in a single machine the functions of printing and optical scanning with automatic document/sheet feeders.

If a document is misaligned with respect to the optical sensor, the resultant image is similarly skewed. Because the contents of a document page are usually aligned with the page itself, a skewed page usually results in a misalignment with the optical sensor.

Pasco et al., U.S. Pat. No. 5,818,976, disclose a system for skew and size/shape detection of a document. The system performs the following basic steps, (1) detects points near the edge of the page image, (2) fits lines to establish a closed contour, and (3) defines a polygon with sides coincident with the lines of the closed contour. The polygon defines the size and shape of the page image. With respect to detecting the edges of the page the system uses a background (platen backing cover) that contrasts well with the page, e.g., a black (or gray or patterned) background and white documents. Then the system analyzes the image to determine the edges of the image. Unfortunately, this requires specialized hardware to determine the edge of the image and thus is unsuitable for general purpose scanning devices. If a contrasting background is not used, Pasco et al. suggest the use of electromechanical switches or optical switches arranged to sense the location of edges of each page in conjunction with scanning. Likewise, this requires specialized hardware to determine the edge of the image and thus is unsuitable for general purpose scanning devices.

What is desired, therefore, is a system that can determine the general bounding region of a document without additional specialized hardware.

DETAILED DESCRIPTION OF THE DRAWINGS

DETAILED DESCRIPTION OF THE PREFERRED EMBODIMENT

The present inventors considered the existing prior art systems, which generally use specialized physical devices such as sheet feeders, document delivery systems, specially designed platen covers, multiple light sources, etc. Each of the systems is unsuitable for general purpose document edge detection because it requires modification or otherwise specialized design of the hardware for the system. The present inventors then further considered typical existing scanning devices and came to the realization that many include a cover thereon under which the original document is positioned. Traditional wisdom suggests that a cover having substantially the same color as the background of the document contained thereunder, such as a white colored cover and a white document, is unsatisfactory for determining the edge of the document. For example, Pasco. et al., U.S. Pat. No. 5,818,976, in fact teach the use of a cover that contrasts well with the page. In direct contrast to this traditional wisdom, the present inventors realized that a cover with the same general color as the document itself may be used in determining the boundary of a document. In actual systems, the document does not tend to lay perfectly flush against the cover and accordingly, when the document is illuminated, a slight shadow is cast by the document onto the cover along a sufficient portion of the edge of the document.

Figure 1:
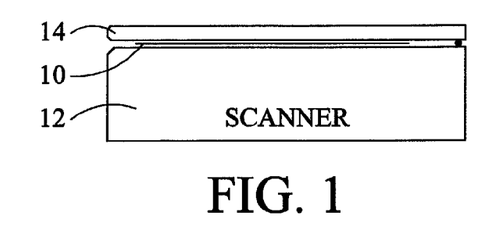
FIG. 1 is an exemplary illustration of a scanner, document and cover.

Referring to FIG. 1, a document 10 is supported by a scanning device 12 with a cover 14 covering the document 10, all of which may be flat. Preferably, the cover is substantially flat. Preferably, a major portion of or all of, the cover has substantially the same color as the background color of the document to be scanned. More specifically, preferably a major portion of the portion of the cover proximate the edge of the document preferably has substantially the same color as the background color of the document to be scanned. The scanning device may be any type of device capable of obtaining or otherwise sensing an image of the document 10. The document 10 may be any type of document or otherwise an object that is sensed by the scanning device 12. In addition, the scanner may use a roller or other backing arranged in a manner opposing the imaging system with respect to the document.

Figure 2A:
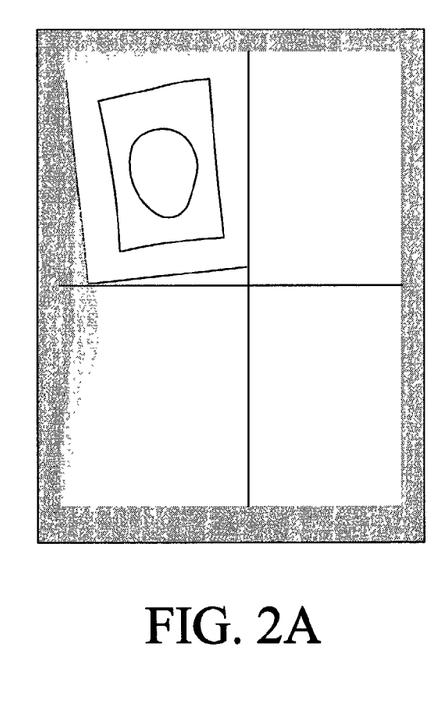
FIGS. 2A, 2B AND 2C illustrate sample images.
Figure 2B:
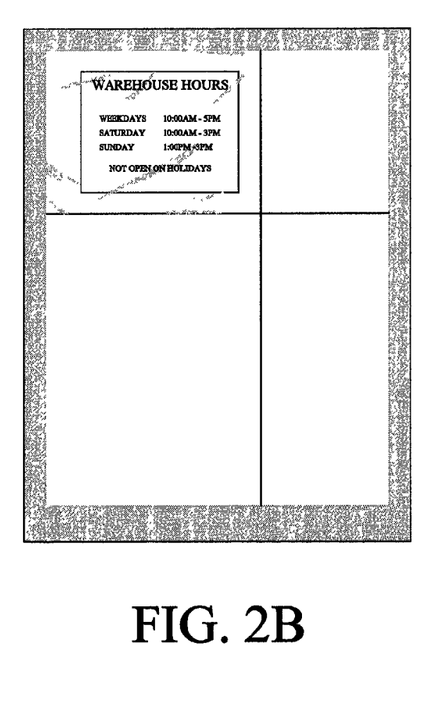
Figure 2C:
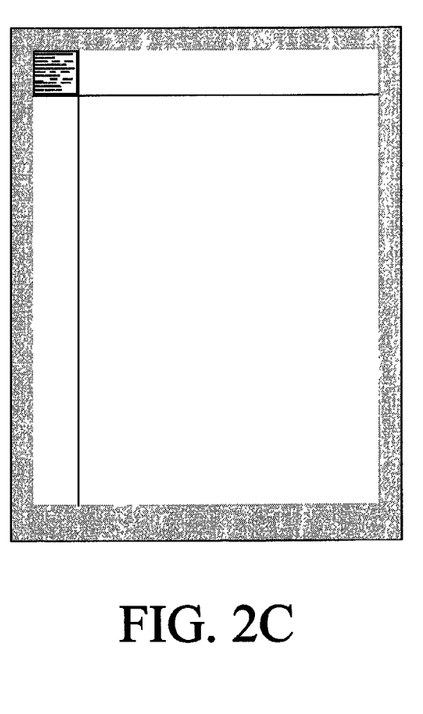

Referring also to FIGS. 2A–2C, the document 10 including a portion of the cover 14 extending beyond the periphery of the document 10 is imaged or otherwise sensed by the system. FIG. 2A illustrates a scanned document with a skew, together with horizontal and vertical boundary lines. FIG. 2B illustrates a scanned document with wrinkles, together with horizontal and vertical boundary lines. FIG. 2C illustrates a small document, together with horizontal and vertical boundary lines. The image acquisition may be a normal scan, a preview scan at a lower resolution than the normal scan, a preview scan at a higher resolution than the normal scan or any other type of image acquisition. The image is normally acquired in a color space that includes red, green, and blue. Alternatively, any set of one or more colors may be used, black and white, or any other image description scheme. The edges of the document 10 cast a slight shadow onto the cover, at least a portion of which is likewise sensed. The resulting image together with the shadow may be processed in any suitable manner to determine the size or boundaries of the document.

Figure 3:
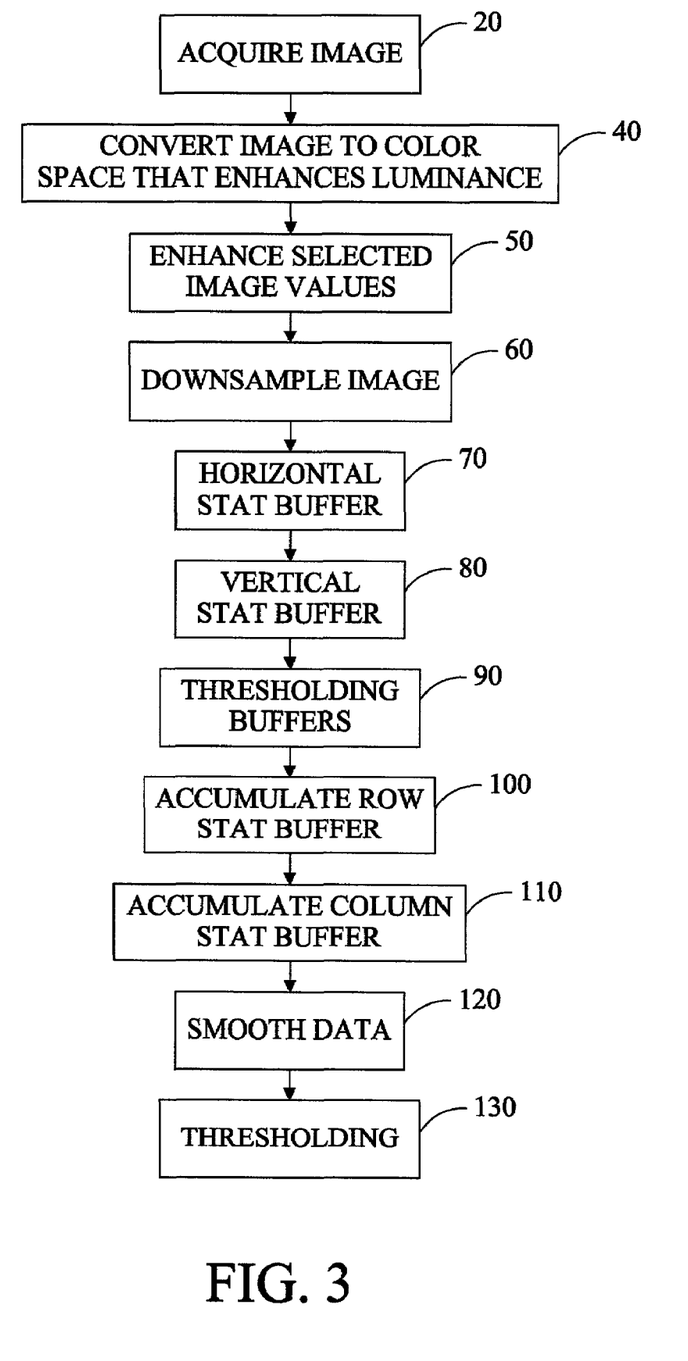
FIG. 3 is an exemplary process flow chart.

The process described below is suitable for processing image documents in general and particularly suitable for processing the imaged document shown in FIGS. 2A–2C. The process is defined in terms of the document being properly registered with respect to the top-left corner of the platen. It is to be understood that the process may be readily extended to the document being located at any position, including a random position and random orientation. In addition, the number (e.g., one, two, three, four, five, etc) of vertical and horizontal boundary lines (including other orientations of the boundary lines, such as inclined) may be extended depending on the location and shape of the document. Referring to FIG. 3, after acquisition of the image 20 in a red, blue, green color space the image 20 is preferably converted from the reg, green, blue color space to a color space that enhances the luminance of the image at block 40. With a document that is sensed under relatively uniform illumination, especially when narrow shadows are to be sensed, it is preferable to process the image therefrom in terms of enhanced luminance. It is to be understood that the image may be processed in any color space, as desired. The conversion from the red, green, blue color space to luminance Y may be computed as: $Y=(0.3R+0.59G+0.1B)$. Preferably the acquired image 20 is obtained at a lower resolution than the normal resolution used by the system for creating a copy in order to reduce the memory requirements. The conversion from a triplet color space (e.g., red, green, blue) to a luminance results in a reduction of the data by approximately a third, which reduces the memory requirements of the system and the computational complexity.

Preferably after converting the image to a color space that enhances luminance, the predicted range of values representative of anticipated document boundary edges may be stretched or otherwise enhanced to provide a greater weight, sensitivity, or otherwise, at block 50. Stretching increases the robustness of the edge detection process and enhances shadow edges by increasing the differences of pixel values in the range of likely document edge values and by attenuating edge magnitudes in the color range of the scanner cover and other data such as text. For example, pixels having a luminance in the range of 190–220 (potential values from 0–256) may be stretched to the range of 170–240 by applying an S-curve. It is to be understood that any modification of the image to enhance image characteristics likely to be characteristic of the edge of a document may be used. In addition, the image modification by conversion to luminance enhancement, stretching, if performed at all, may be performed at any time during processing.

Preferably after converting and stretching the image, the image is down sampled to a lower resolution, such as 75×75 dpi, at block 60. Down sampling the image from a 300×150 preview scan resolution to a 75×75 resolution results in approximately an 8 times reduction in the data. This likewise results in a consistent sampling density for further processing, which provides greater consistency for image processing and more flexibility in implementing the system on different platforms. A 75×75 resolution generally results in no more than 640×896 pixels (an A4 U.S. letter-sized scanner platen is assumed without loss of generality). In addition, down sampling the luminance enhanced data is less computationally intensive than down sampling the original image data. For example, a 1×4 box filter average in the horizontal direction and a two tap IIR filter in the vertical direction may be used.

The image resulting from the down sampling 60 may subsequently be divided into row strips (e.g., 32-pixels high) and column strips (e.g., 32-pixels wide). For each row strip, a set of contiguous sub-rows may be selected, such as 8, 16, or 32 rows. For each column strip, a set of contiguous sub-columns may be selected, such as 8, 16, or 32 columns. In essence, the down sampled image 60 is partitioned into a set horizontal strips consisting of a group of rows, and into a set of vertical strips consisting of a group of columns. It is to be understood that any number of pixel strips, any number of sub-strips, contiguous or non-contiguous, may be used. For the illustrated example, 8 element sub-strips are used, simply for ease of illustration.

Figure 4A:
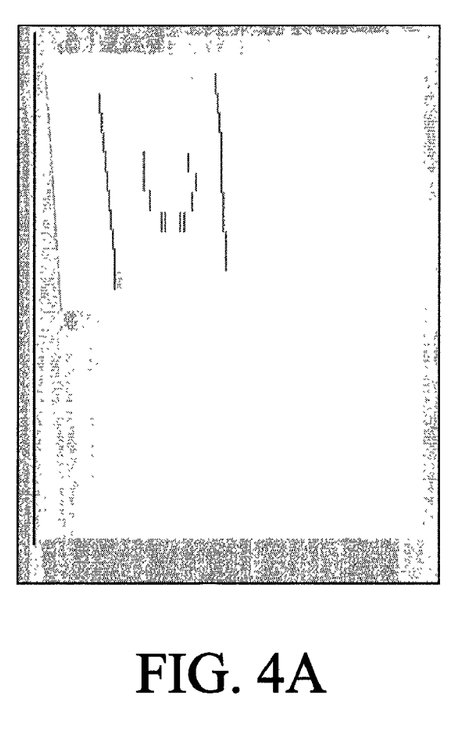
FIGS. 4A and 4B illustrate stat buffers.

The transverse average for each horizontal sub-strip is computed and stored in a horizontal stat buffer, at block 70. It is to be understood that any other statistical measure for each horizontal sub-strip may likewise be used, as desired. In the particular example illustrated, each 8-row horizontal sub-row is 640 columns wide. In the illustrated example there are 28 such 640 element row-stat buffers for the image. An exemplary row stat buffer is shown in FIG. 4A for the image shown in FIG. 2A.

Similarly, the transverse average for each vertical sub-strip is computed and stored in a vertical stat buffer, at block 80. It is to be understood that any other statistical measure for each vertical sub-strip may likewise be used, as desired.

Figure 4B:
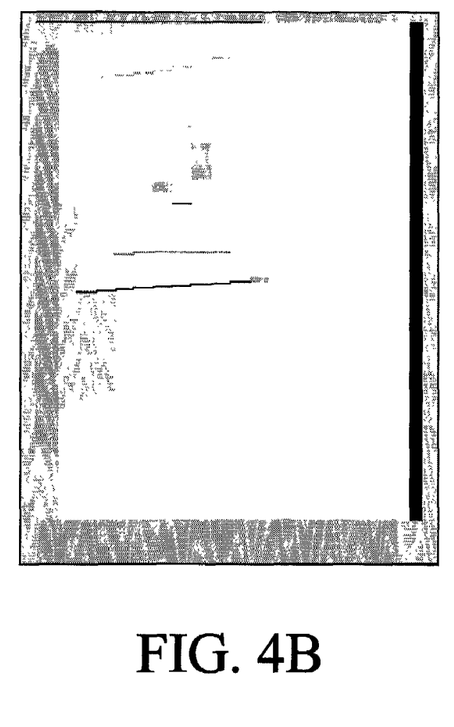

In the particular example illustrated each 8-column sub-strip is 896 rows high. In this example there are 20 such 896 element column stat buffers. The number and length of the row and column buffers may be selected, as desired. An exemplary column stat buffer is shown in FIG. 4B for the image shown in FIG. 2A.

The use of column and row statistical buffers permits the simulation of a larger convolution kernel which results in more robust processing and likewise reduces the amount of data. Further, the transverse processing reinforces the image detail in a transverse direction which emphasizes the shadow on the edges of a document. In addition, the relatively tall filter relative to the typical height of the text tends to attenuate the text.

At block 90 a localized 1-dimensional difference operator identifies the edges of the image whose magnitude difference is above a selected threshold. For example, points whose measured local difference along the row (or column) stat buffer is greater than 10 may be considered edges. It is to be understood that any one or multi-dimensional operator which identifies edges in an image may likewise be used. The use of an appropriate operator tends to identify those regions of the image that are candidate regions of the shadow cast by the document. Conceptually, this results in another row stat data structure and another column data structure where edges are identified.

Figure 5A:
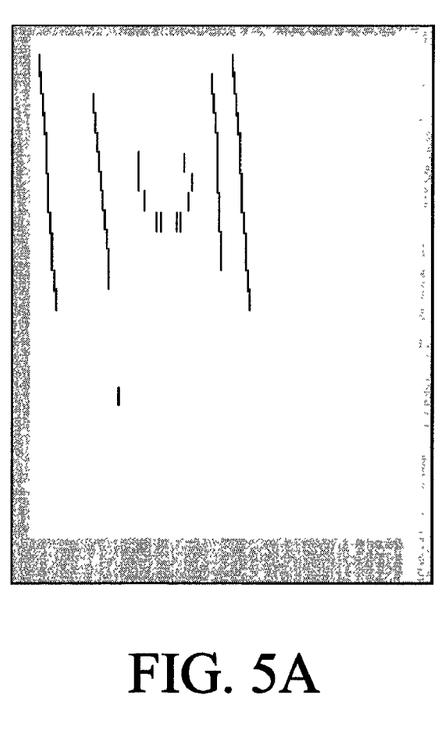
FIGS. 5A and 5B illustrate accumulation buffers.
Figure 5B:
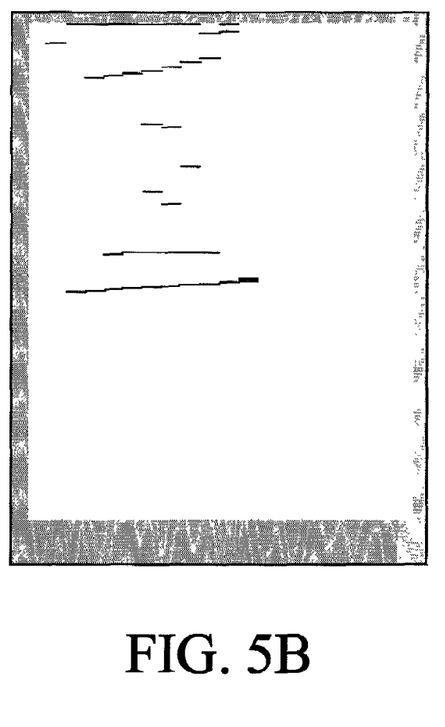

With the potential edge regions of the row stat buffer identified, or otherwise potential edge regions of the image, the total number of potential identified edge features for each transverse column are summed together. The total number of edge features for each transverse column is stored in an accumulation row buffer at block 100. An exemplary accumulation row buffer is illustrated in FIG. 5A, with each vertical line representative of a region of 32 pixels. Similarly, with the potential edge regions of the column stat buffer identified, or otherwise potential edge regions of the image, the total number of potential identified edge features for each transverse row are summed. The total number of edge features for each transverse row is stored in an accumulation column buffer at block 110. An exemplary accumulation column buffer is illustrated in FIG. 5B, with each horizontal line representative of a region of 32 pixels. This results in an increased likelihood of accurately determining the appropriate horizontal and vertical positioning of the edges resulting from the cast shadow. Further, another significant reduction of the amount of data is accomplished, e.g., 28 (rows)×640 (columns) to 1 (row)×640 (columns).

Figure 6A:
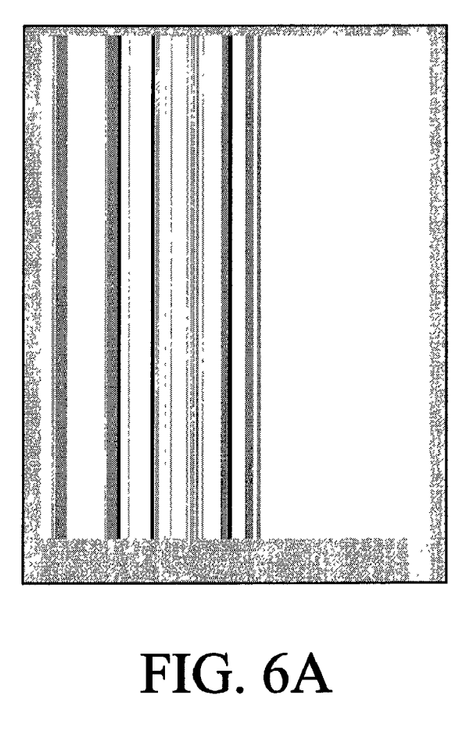
FIGS. 6A and 6B illustrate smoothed buffers.
Figure 6B:
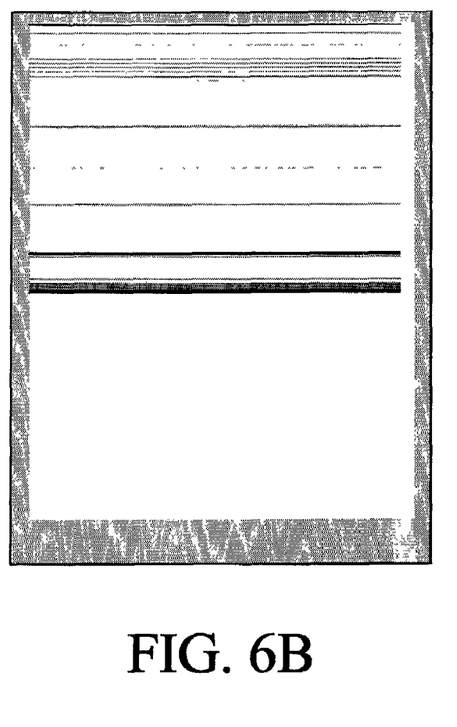

While transverse accumulation aids in identification of those regions of potential shadows, however, the potential skew of the document itself tends to spatially spread the apparent edge. To compensate for the potentially skewed edge, the data in the accumulator is passed through a smoothing function at block 120, such as for example, a Gaussian filter [1, 2, 1]. In essence, each particular value is adjusted in accordance with its neighboring values. The effect is to emphasize values in regions having significant spatially adjacent or proximate values. An exemplary smoothed data set of the row buffer is shown in FIG. 6A and an exemplary smoothed data set of the column buffer is shown in FIG. 6B. Alternatively, emphasizing values in regions spatially adjacent or proximate to one another may be undertaken during other processes, such as the accumulation process.

The boundary of the image, or otherwise the document, may be determined based upon the largest value in the accumulator or as a result of the smoothing. Another technique to determine the boundary of the image is to select the outermost value greater than a sufficient threshold at block 130. In addition, the system may likewise determine the boundary region of the image, text or other content on the document. However, larger images tend to have larger smoothed accumulator values, while smaller images tend to have smaller smoothed accumulator values. This difference in the maximum values tends to make it difficult to select an appropriate threshold value. To overcome the thresholding dilemma, the present system may incorporate a threshold that is expressed as a percentage (or other statistical measure) of the maximum observed row or column edge count (or other criteria). This permits a single threshold to be used for both the horizontal and vertical boundaries, even with different sensitivities in each direction. The horizontal boundary of the document may then be considered as the right-most row edge count above the row-scaled threshold. The vertical boundary threshold may then be considered as the bottom-most column edge count above the column-scaled threshold. Moreover, a single threshold value is likewise generally scale and directionally invariant.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An imaging system comprising:
    (a) an imaging device sensing an object having a first background color;
    (b) a backing in opposing relationship with said object having a second background color substantially the same as said first background color; and
    (c) said imaging system determines at least one general bounding region of said object based upon a shadow cast onto said backing by said object.

2. The imaging system of claim 1 wherein said object is a substantially flat document.

3. The imaging system of claim 2 wherein said backing is a cover and is substantially flat and is in face-to-face relationship with said object.

4. The imaging system of claim 3 wherein said second background color covers a major portion of said cover.

5. The imaging system of claim 4 wherein said imaging system determines a plurality of boundaries of said object.

6. The imaging system of claim 5 wherein said imaging system determines four boundaries of said object.

7. The imaging system of claim 5 wherein said imaging device has a flat surface supporting said object.

8. The imaging system of claim 7 wherein said object is paper.

9. The imaging system of claim 1 wherein said imaging system converts a first color space of an image obtained from sensing said object to a second color space where the luminance of said image is enhanced over the first color space for determining said at least one boundary of said object.

10. The imaging system of claim 9 wherein said first color space includes a plurality of dimensions and said second color space includes fewer dimensions than said first color space.

11. The imaging system of claim 10 wherein said first color space is red, green, and blue, and said second color space is luminance.

12. The imaging system of claim 1 wherein said imaging system increases the differences of values in the range of likely document edge values.

13. The imaging system of claim 12 wherein said imaging system converts a first color space of an image obtained from sensing said object to a second color space where the luminance of said image is enhanced over the first color space when determining said at least one boundary of said object.

14. The imaging system of claim 1 wherein an image obtained from sensing said object has a plurality of horizontal rows of pixels, said imaging system dividing said horizontal rows of pixels in a plurality of groups, each of said groups including a plurality of said horizontal rows of pixels, computing a statistical measure in a direction transverse to said horizontal row of pixels, using said statistical measure in determining said at least one boundary of said object.

15. The imaging system of claim 14 wherein an image obtained from sensing said object has a plurality of vertical columns of pixels, said imaging system dividing said vertical columns of pixels in a plurality of groups, each of said groups including a plurality of said vertical columns of pixels, computing a statistical measure in a direction transverse to said vertical column of pixels, using said statistical measure in determining said at least one boundary of said object.

16. The imaging system of claim 15 further comprising determining edges within the data determined as a result of computing said statistical measures.

17. The imaging system of claim 14 further comprising determining edges within the data determined as a result of computing said statistical measure.

18. The imaging system of claim 17 wherein a set of statistical measures in a direction transverse to said horizontal row of pixels from a plurality of said groups are statistically processed for determining said at least one boundary of said object.

19. The imaging system of claim 18 wherein the result of processing said set of statistical measures are further processed to emphasize spatial regions of increased statistical measure.

20. The imaging system of claim 18 wherein said determining said at least one boundary of said object is based upon a variable threshold value calculated based upon said set of statistical measures.

21. The imaging system of claim 20 wherein said variable threshold value is calculated based upon a percentage of the maximum observed statistical measure.

22. The imaging system of claim 1 wherein an image obtained from sensing said object has a plurality of vertical columns of pixels, said imaging system dividing said vertical columns of pixels in a plurality of groups, each of said groups including a plurality of said vertical columns of pixels, computing a statistical measure in a direction transverse to said vertical column of pixels, using said statistical measure in determining said at least one boundary of said object.

23. The imaging system of claim 22 further comprising determining edges within the data determined as a result of computing said statistical measure.

24. The imaging system of claim 23 wherein a set of statistical measures in a direction transverse to said vertical column of pixels from a plurality of said groups are statistically processed for determining said at least one boundary of said object.

25. The imaging system of claim 24 wherein the result of processing said set of statistical measures are further processed to emphasize spatial regions of increased statistical measure.

26. The imaging system of claim 24 wherein said determining said at least one boundary of said object is based upon a variable threshold value calculated based upon said set of statistical measures.

27. The imaging system of claim 26 wherein said variable threshold value is calculated based upon a percentage of the maximum observed statistical measure.

28. An imaging system comprising:
    (a) an imaging device sensing an object;
    (b) a backing in opposing relationship with said object; and
    (c) wherein said imaging system determines at least one general bounding region of said object by converting a first color space of an image obtained from sensing said object to a second color space where the luminance of said image is enhanced over the first color space for determining said at least one boundary of said object.

29. The imaging system of claim 28 wherein said first color space includes a plurality of dimensions and said second color space includes fewer dimensions than said first color space.

30. The imaging system of claim 29 wherein said first color space is red, green, and blue, and said second color space is luminance.

31. The imaging system of claim 28 wherein said imaging system increases the differences of values in the range of likely document edge values.

32. The imaging system of claim 28 wherein an image obtained from sensing said object has a plurality of vertical columns of pixels, said imaging system dividing said vertical columns of pixels in a plurality of groups, each of said groups including a plurality of said vertical columns of pixels, computing a statistical measure in a direction transverse to said vertical column of pixels, using said statistical measure in determining said at least one boundary of said object.

33. The imaging system of claim 32 further comprising determining edges within the data determined as a result of computing said statistical measure.

34. The imaging system of claim 33 wherein a set of statistical measures in a direction transverse to said vertical column of pixels from a plurality of said groups are statistically processed for determining said at least one boundary of said object.

35. The imaging system of claim 34 wherein the result of processing said set of statistical measures are further processed to emphasize spatial regions of increased statistical measure.

36. The imaging system of claim 34 wherein said determining said at least one boundary of said object is based upon a variable threshold value calculated based upon said set of statistical measures.

37. The imaging system of claim 36 wherein said variable threshold value is calculated based upon a percentage of the maximum observed statistical measure.

38. An imaging system comprising:
    (a) an imagine device sensing an object;
    (b) a backing in opposing relationship with said object;
    (c) said imaging system determining at least one general bounding region of said object; and
    (d) wherein an image obtained from sensing said object has a plurality of horizontal rows of pixels, said imaging system dividing said horizontal rows of pixels in a plurality of groups, each of said groups including a plurality of said horizontal rows of pixels, computing a statistical measure in a direction transverse to said horizontal row of pixels, using said statistical measure in determining said at least one boundary of said object.

39. The imaging system of claim 38 wherein an image obtained from sensing said object has a plurality of vertical columns of pixels, said imaging system dividing said vertical columns of pixels in a plurality of groups, each of said groups including a plurality of said vertical columns of pixels, computing a statistical measure in a direction transverse to said vertical column of pixels, using said statistical measure in determining said at least one boundary of said object.

40. The imaging system of claim 39 further comprising determining edges within the data determined as a result of computing said statistical measures.

41. The imaging system of claim 8 further comprising determining edges within the data determined as a result of computing said statistical measure.

42. The imaging system of claim 41 wherein a set of statistical measures in a direction transverse to said horizontal row of pixels from a plurality of said groups are statistically processed for determining said at least one boundary of said object.

43. The imaging system of claim 42 wherein the result of processing said set of statistical measures are further processed to emphasize spatial regions of increased statistical measure.

44. The imaging system of claim 42 wherein said determining said at least one boundary of said object is based upon a variable threshold value calculated based upon said set of statistical measures.

45. The imaging system of claim 44 wherein said variable threshold value is calculated based upon a percentage of the maximum observed statistical measure.

* * * * *

UNITED STATES PATENT AND TRADEMARK OFFICE
CERTIFICATE OF CORRECTION

PATENT NO. : 6,987,880 B2 Page 1 of 1
APPLICATION NO. : 09/814585
DATED : January 17, 2006
INVENTOR(S) : Dolan et al.

It is certified that error appears in the above-identified patent and that said Letters Patent is hereby corrected as shown below:

<u>Column 3,</u>
Line 67, change "Y=(0.3R+0.59G+0.1B)" to -- Y=(0.3R+0.59G+.011B) --.

Signed and Sealed this

Twentieth Day of June, 2006

JON W. DUDAS
*Director of the United States Patent and Trademark Office*